T. W. LINGARD.
SAFETY DEVICE.
APPLICATION FILED OCT. 21, 1909.
952,915.
Patented Mar. 22, 1910.
2 SHEETS—SHEET 1.
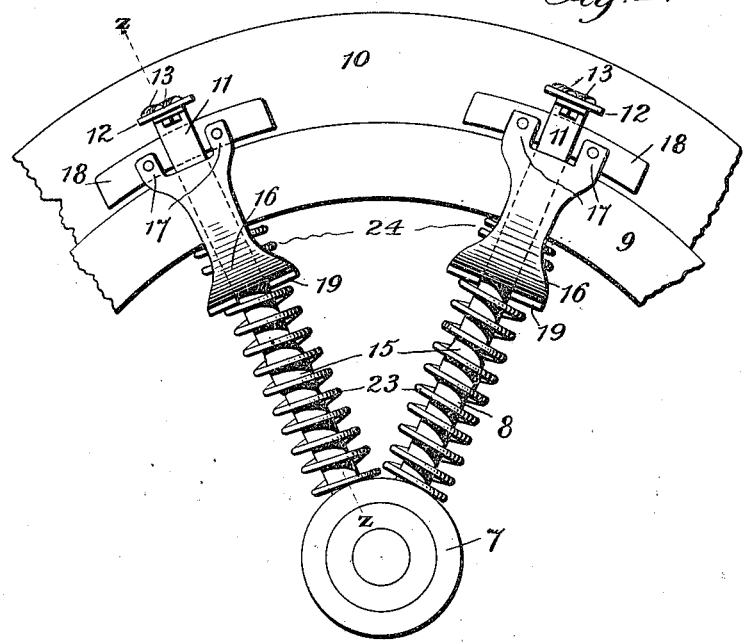
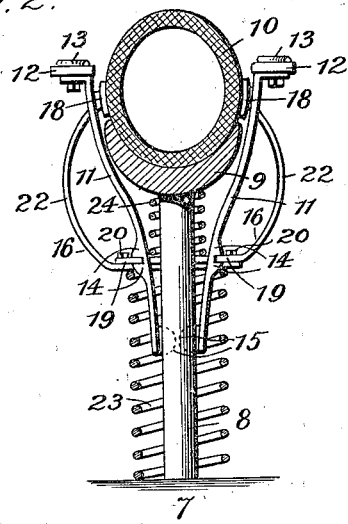
Witnesses:
Jas E Hutchinson
Edwin E Daly
Inventor:
Thomas W. Lingard,
By Royal E. Burnham, Attorney T. W. LINGARD.
SAFETY DEVICE.
APPLICATION FILED OCT. 21, 1909.
952,915.
Patented Mar. 22, 1910.
2 SHEETS—SHEET 2.
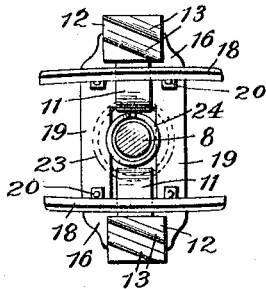
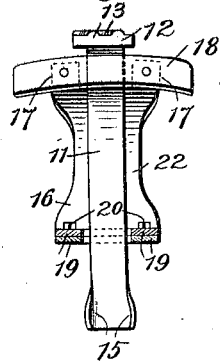
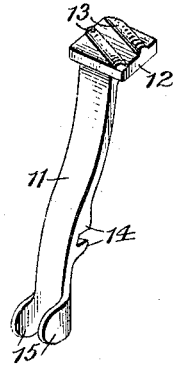
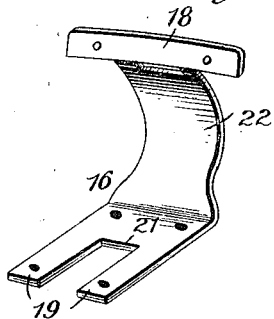
Witnesses:
Jas Es Hutchinson
Edwin P. Daly
Inventor
Thomas W. Lingard,
By Ryal E. Burnham, Attorney

UNITED STATES PATENT OFFICE.

THOMAS WM. LINGARD, OF OAK GROVE, ALABAMA.

SAFETY DEVICE.

952,915.  Specification of Letters Patent.  Patented Mar. 22, 1910.

Application filed October 21, 1909. Serial No. 523,836.

*To all whom it may concern:*

Be it known that I, THOMAS W. LINGARD, a citizen of the United States, residing at Oak Grove, in the county of Mobile and State of Alabama, have invented certain new and useful Improvements in Safety Devices, of which the following is a specification, reference being had therein to the accompanying drawing.

The protecting means provided by this invention is for use particularly with pneumatic tires, although it is in addition susceptible for use with other resilient tires, such as cushion or the like. The arrangement is such that when a tire of a vehicle bursts or is punctured or otherwise becomes deflated, resiliently resistive supports, arranged radially around the wheel, will be automatically brought into use as treads, thereby enabling the vehicle to continue its progress to a place where repairs can conveniently be made or a new tire substituted. Further, in case of accident to a tire, when the vehicle is running at high speed, the supports will prevent sudden swerving of the vehicle from its course and injury to the vehicle and its occupants. Another function performed by the supports is that, when a vehicle using them is passing over a soft or sandy road, they prevent the wheels from sinking unduly deep. The supports also operate to prevent skidding of a vehicle to the wheels of which they are attached. Clasps are also provided which engage the side of the tire along the wheel-rim and form a reinforcement where there is much wear on the tire.

When read in connection with the description herein, the details of construction and arrangement of parts contemplated by this invention will be apparent from the accompanying drawings, forming part hereof, wherein an embodiment of the invention is disclosed, for purposes of illustration.

While the embodiment shown in the drawings is preferred, it is to be understood that the several instrumentalities of which the invention consists can be variously organized, without departing in the least from the nature and spirit of the invention, and that the invention is not limited to this delineation.

Like reference-characters refer to corresponding parts in the several views of the drawings, of which—

Figure 1 is a view of a sector of a wheel having the safety device fitted thereto; Fig. 2 is a sectional view on the line $z$—$z$, Fig. 1; Fig. 3 is a top view of a support; Fig. 4 is an interior view of a support; Fig. 5 is an outside view of a tread member; and Fig. 6 is a view of a section of a clasp member.

Having more particular reference to the drawings, and to a wheel to which this invention is applied, 7 designates the hub of the wheel, 8 the spokes, 9 the rim, and 10 a resilient tire, in this instance pneumatic. The safety devices of this invention are associated with the spokes, rim and tire of the wheel. Each device includes two tread members 11, each extending from a place on a spoke intermediate the hub and rim on each side of the rim and tire and terminating at its outer end between the edge of the rim and the tread of the tire when the latter is normally inflated or distended. The outer end of each tread member is formed with a laterally-extending tread 12, having on its tread surface one or more cleats or ribs 13 to deter both circumferential and side slipping of the wheel when the treads are in contact with the ground. The treads may be made integral with the tread members, or preferably they may be bolted or riveted thereto, in order to permit renewal without replacement of the entire member. Complementary lugs or stops 14 are positioned on the outer face of each tread member. The inner end of each tread member has thereon an inwardly-extending clasp 15 which embraces the spoke.

A clasp member 16, of spring material, and of substantially U-shaped formation, has, on its ends, inwardly-extending limbs 17, which embrace the tread member and carry flat segmental clasps 18, which bear against the sides of the tire at or about the rim. Each clasp member is formed of two sections, having transversely-extending arms 19 which embrace the spoke. The arms 19 of one section engage and lap those of the other section and are held together by bolts 20, so that the clasp member may be withdrawn from the wheel when desired. The edge 21 of each section between the arms seats against the tread member and between the lugs or stops 14 thereof, when the two sections of the clasp member are drawn and secured together and the clasps 18 are forced against the tire on each side. Each clasp member is bowed outwardly from the tread members between the lugs 14 and the clasps 18, forming spring portions 22. A coil spring 23 is disposed on the spoke, between the hub and clasp member, and it has a tendency to force that member, and with it the tread members by engagement with lugs 14, outwardly. A coil spring 24 is disposed on the spoke between the clasp member and wheel-rim, and it has a tendency to force the clasp member toward the hub.

When the tire is normally inflated or distended, the engagement of the clasps 18 with the tire at or near the rim maintains the clasp members and with them the tread members in retracted positions, where the treads do not come in contact with the ground, except when the wheels are running on soft or sandy soil. In the latter case, such contact does occur, and undue sinking of the wheels is prevented. When a tire bursts, is punctured, or otherwise becomes deflated, the gripping engagement of the clasps will be somewhat relieved, and the action of the springs 23 serve to extend the treads beyond the tread surface of the deflated tire and to place them in position to act as treads for the wheel and to relieve the tire of its supporting function. The weight imposed on the wheel is thus automatically transferred from the tire to the tread members. The coil springs 24 operate to prevent the forcing of the clasp members against the wheel rim on the inside and the too great extension of the tread members, the lugs or stops 14 resulting in uniform outward and inward movement of both clasp and tread members as far as the action of the coil springs is concerned. The coil springs are made sufficiently strong to take up the weight usually imposed upon the tread members. When, however, these members are so far retracted as to bring the clasps 18 against the wheel-rim, the outwardly-curved portions 22 of the clasp members, which are made of spring material, will permit a further and limited amount of retraction in the treads and take up and prevent jar in the vehicle.

Having thus described my invention, what I claim as new, and desire to secure by Letters Patent, is—

1. In a vehicle-wheel, the combination, with a deflatable tire, of a clasp engaging the tire when distended and held thereby in retracted position, a spring operating to move said clasp outwardly on deflation of the tire, and a tread member associated with said clasp and movable outwardly therewith.

2. In a vehicle-wheel, the combination, with a deflatable tire and the wheel-rim therefor, of a clasp pressing near the rim against each side of the tire when the latter is distended, means operating to move said clasp outwardly when the tire is deflated, a tread associated with said clasp and movable outwardly therewith, and resilient means for limiting the outward movement of said clasp and tread.

3. In a vehicle-wheel having a hub and a rim and a deflatable tire on the rim, the combination of a tread member extending from a place intermediate the hub and rim to a place adjacent a side of the tire, a spring having a tendency to extend said tread member outwardly, and a clasp pressing near the rim against each side of the tire when the latter is distended and operating to hold said tread member in retracted position.

4. In a vehicle-wheel having a hub and a rim and a deflatable tire on the rim, the combination of a clasp pressing near the rim against each side of the tire when the latter is distended and extending around the rim from one side of the tire to the other, tread members one on each side extending from a place intermediate the hub and rim through slots in said clasp to position adjacent the sides of the tire, and springs having a tendency to extend said tread members outwardly, said clasp being arranged to hold said tread members in retracted position when the tire is distended and to permit extension when the tire is deflated.

5. In a vehicle-wheel having a spoke and a rim and a deflatable tire on the rim, a clasp member associated with the spoke and having spring portions pressing near the rim against the tire on each side, a spring carried by the spoke and having a tendency to force said clasp member outwardly, and a tread member movable outwardly with said clasp member, the arrangement being such that the tread is retained in retracted position by engagement of the clasp member with the tire when distended and that the spring will force the tread member outwardly on deflation of the tire.

6. In a vehicle-wheel having a hub and a rim and a deflatable tire on the rim, a safety device comprising two tread members, each extending from a place intermediate the hub and rim on each side of the rim and tire and terminating at its outer end between the edge of the rim and tread of the tire when the latter is distended, a clasp member of substantially U-shaped formation having on its ends inwardly-extending limbs, clasps on said limbs bearing against the side of the tire near the rim whereby the clasp member is normally held in fixed position, means associated with the clasp member and tread members whereby movement in one causes movement in the other, and a spring having a tendency to extend said tread members outwardly.

In testimony whereof I affix my signature in presence of two witnesses.

THOMAS WM. LINGARD.

Witnesses:
M. SHERRY,
R. M. SMITH.